P. RIESECK.
COMPENSATING JOURNALS.
No. 186,167.  Patented Jan. 9, 1877.
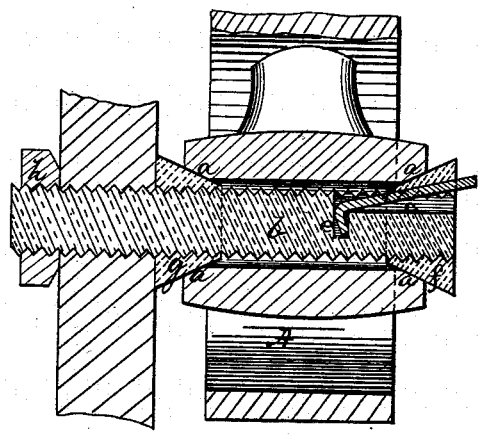
Fig. 1.
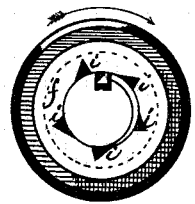
Fig. 2.
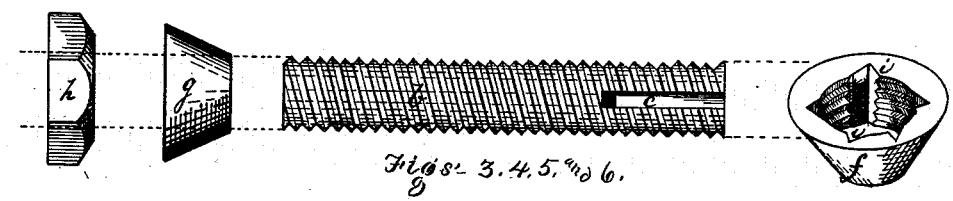
Figs. 3, 4, 5, and 6.
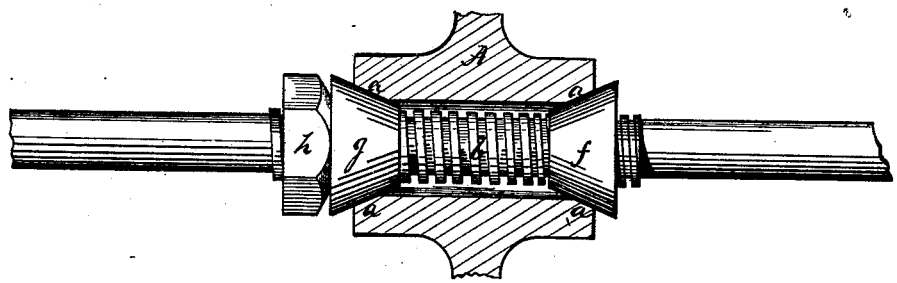
Fig. 7.
Witnesses:
R. C. Walshall
L. C. Fitter
Inventor:
Peter Rieseck,
by Bakewell & Kerr
Attys

UNITED STATES PATENT OFFICE.

PETER RIESECK, OF ALLEGHENY, PENNSYLVANIA.

IMPROVEMENT IN COMPENSATING-JOURNALS.

Specification forming part of Letters Patent No. 186,167, dated January 9, 1877; application filed September 26, 1876.

*To all whom it may concern:*

Be it known that I, PETER RIESECK, of Allegheny, in the county of Allegheny and State of Pennsylvania, have invented a new and useful Improvement in Adjustable Locking-Cone for Compensating-Journals; and I do hereby declare the following to be a full, clear, and exact description thereof, reference being had to the accompanying drawing, forming part of this specification, in which—

Figure 1 is a sectional view of my devices, shown in connection with a wheel. Fig. 2 is an end view of the journal. Figs. 3, 4, 5, and 6 are detached views, and Fig. 7 shows the devices arranged with a loose pulley.

Like letters refer to like parts wherever they occur.

My invention relates to that class of journals wherein adjustable conical bearings are employed to compensate for wear, and to obviate rattling and wabbling of the parts; and it consists, first, in combining with a threaded journal a threaded cone-nut, and ratchet mechanism for locking the same, whereby a simple and effective compensating-journal is obtained; and, secondly, in the combination of a threaded journal with two threaded adjustable cone-nuts, and jam-nut and ratchet mechanism for locking the nuts, so that the journal may be adjusted to different widths of bearing, and the wearing-surfaces of the cones may be changed from time to time, as desired.

I will now proceed to describe my invention, so that others skilled in the art to which it appertains may apply the same.

In the drawing, A may indicate a wheel, fly-wheel, pulley, or like device, and $b$ the journal thereof. This journal or shaft $b$, if short, as in small lathes, sewing-machines, or like articles, may be threaded throughout, or, if a long shaft, then sufficient of the shaft is threaded to accommodate the widest bearing likely to be used, and to permit of lateral adjustment.

In one end of the threaded shaft or journal $b$ I form a longitudinal recess, $c$, at the inner extremity of which a hole, $e$, is drilled, or like means provided for securing one end of a spring-pawl, $d$. The spring-pawl $d$ may be formed by bending and filing, or otherwise shaping a piece of steel wire, and is preferably of sufficient length to extend slightly beyond the end of the shaft or journal $b$.

$f$ is a cone-nut, threaded to correspond with the thread of the journal $b$, but mutilated at any required number of points to form ratchets $i\ i$, wherein the spring-pawl $d$ will engage. $g$ is a second conical nut or follower, which may or may not be provided with ratchet and pawl, according to the position of the journal. In the present instance a short shaft, such as is employed with a sewing-machine or lathe, has been chosen for illustration, and the butt cone or follower $g$ may be jammed against the machine-frame, and the shaft secured thereto by a nut, $h$, but in long fixed shafting, or like mechanism, the nut $h$ would be used as a jam-nut for the butt-follower $g$; or, instead, a ratchet mechanism, such as shown, with conical nut $f$, may be employed. The hub of the fly-wheel or loose pulley A will be reamed or beveled, as at $a$, to permit the adjustment of the cones $f\ g$.

The operation and adjustment of the devices are as follows: The butt cone $g$, having been placed upon the journal or threaded shaft at a suitable point, varying according to the size of the hub, the shaft is secured to a lathe or sewing-machine frame by the nut $h$, the fly-wheel is then pushed on the journal, and the conical bearing-nut $f$ is screwed on the shaft $b$ until the two cone-bearing faces properly support the hub. The ratchet mechanism prevents the cone-bearing $f$ from becoming loose, but permits it to be tightened from time to time to take up any slack arising from the wearing of the bearing. Where a series of loose pulleys are arranged upon a line of shafting, the butt cone $g$ will be jammed by nut $h$, and when it is deemed desirable to change the bearing-surfaces of the cones, the jam-nuts or ratchets may be loosened, and cones turned slightly in either direction, after which the jam-nuts may be tightened.

The advantages of my devices are the facility with which the bearing-surfaces may be changed from time to time without materially changing the position of the pulley, fly-wheel, or like mechanism, and simplicity, effectiveness, and cheapness of construction.

In machinery where a power-pitman or like device is connected to the pulley or wheel, the greatest wear is in the bearing-cone next to the pitman-connection, and in such machinery the facility with which the bearing-surface of the cone may be changed is a great advantage.

Having thus described my invention, what I claim, and desire to secure by Letters Patent, is—

1. In a bearing, the combination of the threaded cone with interposed ratched notches and pawl, substantially as and for the purpose specified.

2. In a bearing, the combination of the threaded journal or shaft, two threaded cone-followers, and jam-nut and ratchet mechanism for locking the conical bearing-nuts, substantially as specified.

In testimony whereof I, the said PETER RIESECK, have hereunto set my hand.

PETER RIESECK.

Witnesses:
F. W. RITTER, Jr.,
FRANK W. SMITH.